W. C. JARDINE.
Brakes and Rests for Carts.
No. 149,404. Patented April 7, 1874.
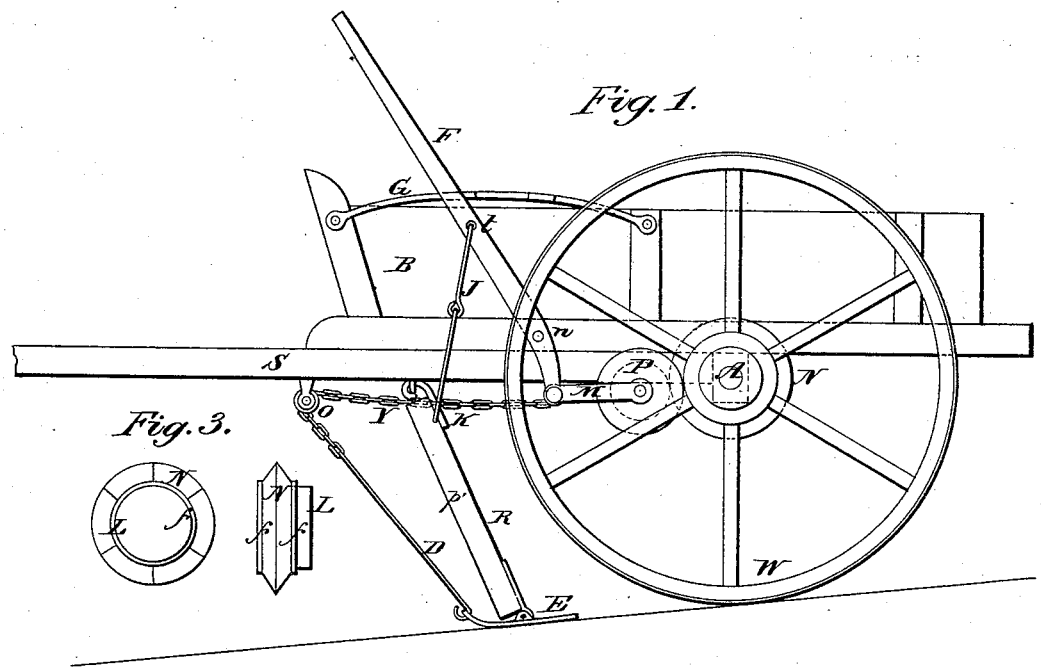
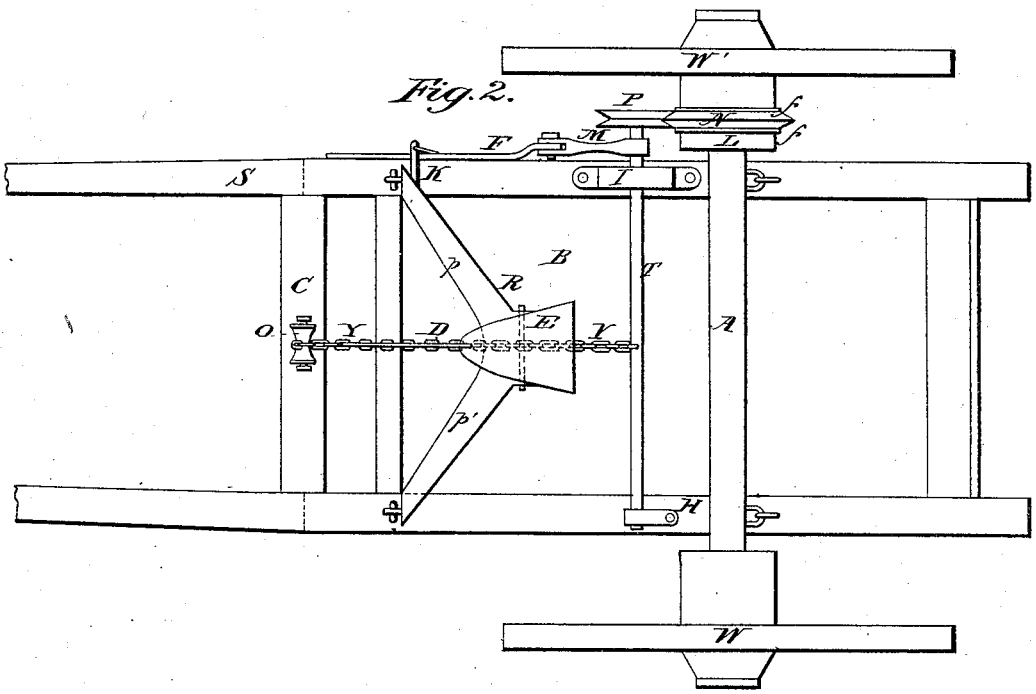
Witnesses.
Isaac R. Oakford
Richard R. Laws
Inventor:
William C. Jardine
pr C. H. Evans
Atty.

UNITED STATES PATENT OFFICE.

WILLIAM C. JARDINE, OF WEST CHESTER, PENNSYLVANIA.

IMPROVEMENT IN BRAKES AND RESTS FOR CARTS.

Specification forming part of Letters Patent No. 149,404, dated April 7, 1874; application filed April 1, 1873.

*To all whom it may concern:*

Be it known that I, WILLIAM C. JARDINE, of West Chester, county of Chester and State of Pennsylvania, have invented a new and Improved Combined Brake and Rest for Carts; and I do hereby declare that the following is a full, clear, and exact description of the construction and operation of the same, reference being had to the accompanying drawings, and to the letters of reference marked thereon.

My invention consists in arranging on an ordinary tilting cart or dray a brake and rest, so that when a cart is propelled down an incline the brake will hold and check the speed, and at the same time the front part of the body of the cart will be supported and the body retained in a horizontal position, thus relieving the weight and strain from the horse's back.

Figure 1 is a side elevation of a cart with my improvement applied. Fig. 2 is a bottom plan of same. Fig. 3 is a detached view of the collar and ring employed.

To enable those skilled in the art to make and use my invention, I will now proceed to describe its construction and operation.

The wheels W and W', body B, axle A, and shafts S are of the usual construction. Suspended beneath the shaft S, a short distance from the cross-piece C, by means of hinged joints, is a rest, R, the said rest being made triangular in form, and composed of pieces *p* and *p'*, one end of each of which is provided with a hook forming a part of the hinge-joint, and the opposite ends enlarged and secured together at the vertex. At the vertex or lower ends of the rest R is pivoted a shoe, E, which is made broad on the face, and the front end turned up, where it has attached to it one end of the rod D. On the hub of the wheel W or W', and on the inside of the spokes of the same, is secured a collar, L, Fig. 3. One end of said collar is provided with flange *f*, and a similar flange, *f'*, is placed a short distance from it, thus leaving a space around the periphery of the collar L. Between the flanges *f* and *f'* is placed a wooden ring, N, which is made in segments, with the ends fitting closely together and the face made V-shaped. A short distance in front of the axle A is placed a circular rod, T, which extends across the shafts S. One end of said rod works loosely in a bearing, B, secured to the under sides of the shafts, and the opposite end has secured on it a friction-pulley, P, the face of which is made with a conical depression, so as to fit the face of the wheel N. Secured to the rod T, on the inner side of the pulley P, is an arm, M. Said arm has an open jaw formed in the end, in which is pivoted the lower end of the lever F. In order to keep the rod T in position, and at the same time to allow the end bearing the pulley P to be moved backward and forward, a guide-plate, I, is secured to the inner side of the shafts S. The lever F is pivoted to the side of the cart at the point *n*, the long arm extending up and above the side-board of the cart, and is held in position by means of notches formed in the arbor G. Connected with the lever F, at the point *t*, is a jointed rod, J. The lower end of said rod connects with an arm, K, secured to the side and upper part of rest R. In the center, and on the under side of the cross-pieces C, is placed a grooved roller, over which passes the chain V, one end of which is attached to the rod D, and the opposite end to the rod T.

The operation of the cart is as follows: As soon as it commences to descend the hill the lever F is moved in a forward direction, which moves the rod T backward, and thus brings the friction-pulley P in contact with the wooden ring N. The friction on the pulley P will rotate it (the pulley) and the shaft T, over which the chain V is wound. The chain V, in winding around the shaft, will draw on the rod D, and draw the lower part of the rest R forward sufficiently to support the weight and keep the body and shafts of the cart in a horizontal position, and thus obviate the difficulty of having the whole weight thrown upon the horse's back, the rest R being drawn forward as the inclination of the hill increases.

I do not wish to claim, broadly, the collar and ring on the hub of the wheel; neither do I claim the rod T, friction-pulley P, arm M, lever F, and arbor G, as I am aware devices somewhat similar to this have been used before; but What I do claim, and desire to secure by Letters Patent of the United States, is—

1. The combination of the jointed rod J, chain V, pulley O, end rest R, having a shoe, E, and arm K, substantially as described.

2. The combination of the rest R, chain V, rod T, pulley P', and wheel-hub, substantially as described.

3. The combination of the rest R, chain V, rod T, pulley P, lever F, arm M, and jointed rod J, substantially as described.

WILLIAM C. JARDINE.

Witnesses:
J. C. MAYER,
W. HIBBARD, Jr.